No. 784,652. PATENTED MAR. 14, 1905.
A. L. BEARDSLEY.
GAGE OR GAGING TOOL.
APPLICATION FILED JUNE 30, 1904.
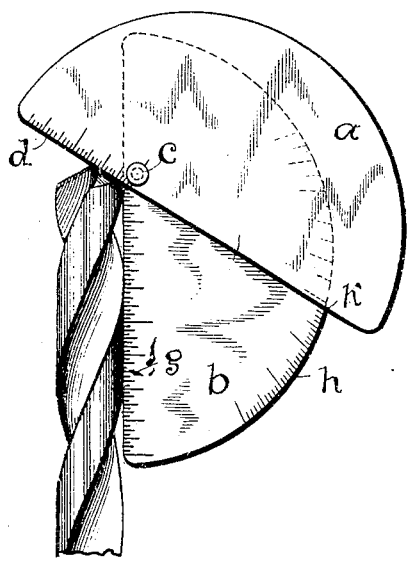
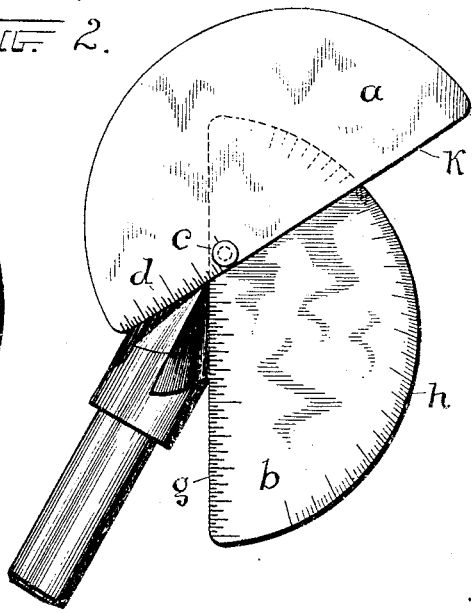
WITNESSES:
INVENTOR.
Arthur L Beardsley
BY H J Fisher
ATTORNEY.

No. 784,652.                                                                                              Patented March 14, 1905.

UNITED STATES PATENT OFFICE.

ARTHUR L. BEARDSLEY, OF CHICAGO, ILLINOIS.

GAGE OR GAGING-TOOL.

SPECIFICATION forming part of Letters Patent No. 784,652, dated March 14, 1905.

Application filed June 30, 1904. Serial No. 214,765.

*To all whom it may concern:*

Be it known that I, ARTHUR L. BEARDSLEY, a citizen of the United States, residing at Chicago, in the county of Cook and State of Illinois, have invented certain new and useful Improvements in Gages or Gaging-Tools; and I do declare that the following is a full, clear, and exact description of the invention, which will enable others skilled in the art to which it appertains to make and use the same.

My invention relates, broadly, to a gage or gaging-tool adapted to be variously used, as hereinafter more specifically set forth; but in the present instance the said tool or gage is illustrated especially in connection with a drill and a reamer to determine their angle of grinding and clearance, all as hereinafter fully described, and particularly pointed out in the claims.

Thus in Figure 1 I show a side elevation of the gage set at a certain determining-angle and a section or portion of drill in truing relation therewith. In Fig. 2 I show a similar gage set at a different angle and a so-called "reamer" or "reaming-tool" in truing relation. Fig. 3 is a view looking down upon the upper edge of the gage and drill-point, as shown in Fig. 1.

As thus shown, the gage or gage-tool is comprised in two semicircular sheet-metal plates or sections $a$ and $b$, pivoted together at $c$ above the center or middle of their straight edges and in such position and relation that the sections may be folded evenly one upon the other when not in use. Structurally the section $a$ is provided with a graduated scale $d$ of about one inch in length along the short portion of its straight edge above pivot $c$, while the other portion of said edge is plain, and section $b$ has a scale $g$ of, say, two inches length along its straight edge below said pivot and a graduated arc-scale $h$ along its outer curved edge, over which the plain edge of section $a$ is adapted to sweep and by which the working edges $d$ and $g$ are set relatively at such angle to each other as the work in hand may require. Thus in Fig. 1 the gage is set at what is the regulation angle of fifty-nine degrees for truing twist-drills, and this angle is obtained by bringing the plain edge $k$ of section $a$ in line with the fifty-ninth-degree mark or line on section $b$. This throws the two edges $d$ and $g$ at the right angle or relation apart to determine the angle on which the drill should be ground, as well as for determining the measurement of the lips, so that both lips shall be ground to uniform length. The same arrangement at a slightly-different angle determines the matter of back clearance for the drill, and by placing edge $d$ of the gage upon the lip of the drill the drill can be turned around under the gage and the operator be enabled to clearly see whether or not the drill will clear itself; but in this case even if the operator does adhere to the regulation angle of fifty-nine degrees for metal this gage has the exceptional and original advantage of being easily and quickly adjusted to the angle at which the drill is ground whatever such angle may be, thereby enabling the operator to test any drill for clearance and to see whether or not the proper angle has been given the same. The value of this adjustable feature is apparent as compared with a rigid gage in this respect particularly that if a drill be ground a little off either way a rigid gage is at once rendered useless, whereas by my improved adjustable gage the matter of angle is immaterial and the test can be made and its real condition ascertained whatever the angle may be. The same general principle applies in Fig. 2, where a reverse or closing angle of the parts is shown and a reamer is subjected to the tests; but in addition to the foregoing uses my improved gage or tool is adapted also to be employed as a protractor for setting bevels to any desired angle and for getting the angle of a countersink, such as is used in countersinking for the heads of screws and bolts, as well as for other purposes not necessarily named herein.

To determine the matter of back clearance for the drill, the gage is trued to the angle of the lip of the drill or other tool and then the tool is turned partially around under the gage to test the difference in angle between the lip and the surface immediately back of the lip. The amount of clearance or ground-away portion of the drill back of the lip is thus instantly disclosed because the angle of the drill back of the lip is or should be less than the lip.

For convenience of reference the plate or member $a$ is referred to as the "upper" or "outer" plate or member and the plate or member $b$ as the "lower" or "under" plate or member, and this agrees with the readings on scale $h$, which are swept by the overlapping outer plate $a$. A further convenience is the reference to pivot $c$ as located above the middle or center of the two plates, the work being brought to the gage in any event below this pivot-point. This also gives plate $a$ the overreach beyond the edge of plate $b$, substantially as shown.

The plates $a$ and $b$ may be of any suitable material, but preferably are developed from sheet metal. The pivot $c$ may be made as close as the tool may require and by any suitable means, as by a close-fitting rivet or by a screw-fastening.

What I claim is—

1. A tool-gage comprising two members of substantially semicircular outline pivoted together above the middle portions of their straight edges, and one of said straight edges provided with a graduated scale at one side of said pivot and the other at the other side.

2. A tool-gage consisting of upper and lower simicircular plates pivotally connected at their straight edges above their center and said plates having graduated scales extending from said pivot-point in opposite directions one from the other, and the lower of said plates having a graduated scale along its outer curved edge overlapped by the said upper plate.

3. A tool-gage consisting of two members of substantially semicircular shape pivoted together at their straight edges above their middle portions, and having graduated scales extending from said pivots in opposite directions one from the other, and one of said members having a graduated scale along its circular edge and overlapped by the other member, substantially as described.

In testimony whereof I sign this specification in the presence of two witnesses.

ARTHUR L. BEARDSLEY.

Witnesses:
W. E. CALDWELL,
W. E. JOY.